United States Patent Office
2,833,801
Patented May 6, 1958

2,833,801

ORGANOSILICON SULFONES

George W. Holbrook, Midland, Mich., assignor to Dow Corning Corporation, Midland, Mich., a corporation of Michigan No Drawing. Application August 3, 1955
Serial No. 526,310

1 Claim. (Cl. 260—448.2)

This invention relates to the reaction products of $SO_2$ and alkenyl organosilicon compounds.

It is the object of this invention to prepare novel organosilicon compounds which are useful in the formation of rubbers, resins and greases. Another object is to prepare improved organosilicon lubricants. Another object is to provide a novel method of curing organosilicon compounds. Other objects and advantages will be apparent from the following description.

This invention relates to organosilicon compounds containing at least $$1 \ \ -\text{C}\overset{O_2}{\text{S}}\text{C}- \text{ group per molecule}$$

in which group the carbon atoms are parts of different aliphatic hydrocarbon groups or aliphatic aryl hydrocarbon groups, each of which is attached to a silicon atom, any remaining valences of the silicon atoms in said organosilicon compound being satisfied with hydrocarbon radicals, halohydrocarbon radicals, hydrocarbonoxy radicals and oxygen atoms.

The compositions of this invention are prepared by the reaction of $SO_2$ with an organosilicon compound having at least 1 alkenyl group per molecule. The alkenyl group may be attached directly to silicon or it may be attached to silicon through an aryl hydrocarbon group. Thus the term alkenyl group as employed herein includes unsaturated aliphatic radicals such as vinyl, allyl, hexenyl and octadecenyl and alkenylaryl groups such as styryl, vinyltolyl, allylphenyl, hexenylxenyl and the like. The reaction of this invention occurs when the reactants are brought together in the presence of a catalyst.

Suitable catalysts include ultraviolet light and oxygenated compounds of relatively mild oxidative power such as amine oxides such as trimethylamine oxide, triethylamine oxide and hexyldimethylamine oxide; metallic chlorates such as silver chlorate, ferric chlorate and sodium chlorate; metallic nitrates such as silver nitrate, ferric nitrate, aluminum nitrate and potassium nitrate; ozonides such as the ozonides of propylene, butylene, octadecylene and substituted olefins; peracids such as peracetic acid, perbenzoic acid and perstearic acid and peroxides such as ascaridole, t-butylhydroperoxide, 2,8-endoperoxyisoindene and acetone peroxide. The catalyst employed should not be as strong an oxidizing as nitric acid since such catalyst will oxidize sulfur dioxide to sulfur trioxide and thereby interfere with the reaction.

The reaction of this invention will occur at temperatures ranging from 0° up. The optimum temperature for any particular combination of alkenyl silicon compound and catalyst will vary and must be determined in each case. In all cases, however, the reaction temperature is readily determined by mixing the ingredients and the catalyst at 0° C. or below and gradually warming the mixture, if necessary, until reaction begins. Indications of reaction are evolution of heat, decrease in volume of the reaction mixture and precipitation of the reaction product.

The compounds of this invention are polymeric materials which are formed by the addition of the $SO_2$ to two different alkenyl groups. These alkenyl groups may be on different silicon atoms or on the same silicon atom. The polymers formed may be linear or cyclic or branched depending upon the nature of the organosilicon compound employed. The precise structural formula of the reaction products cannot be determined since there are several possible ways in which the $SO_2$ and alkenyl group may combine. However, in all cases the sulfur atom of the $SO_2$ is linked to a carbon atom of two different hydrocarbon groups which are, of course, attached directly or indirectly to a silicon atom.

Various structures can be theoretically assigned to the addition products of this invention. If one considers the organosilicon compounds as substituted olefins, such as, for example,

where A represents the silicon fraction of the molecule, then the following additions are possible: a head to head-tail to tail addition in which the polymer unit is of the type

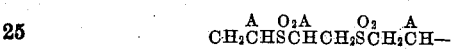

a tail-head-tail-head addition in which the polymer unit is of the type

and a cyclic configuration

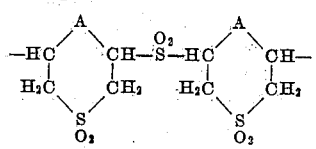

and combinations of these types of structures. The latter configuration is most likely when there are two alkenyl groups attached to the same silicon atom or when alkenyl groups are attached to adjacent silicon atoms in a siloxane such as, for example, symmetrical divinyltetramethyldisiloxane.

It should be understood, of course, that the above configurations refer only to that portion of the structure which is formed by the sulfone addition. In those cases where the organosilicon compound is itself a polymer, infinitely more complicated structures are possible. Consequently it is not possible to show any detailed structure with certainty for any particular reaction product.

The alkenyl organosilicon compounds which can be reacted with $SO_2$ in accordance with this invention include any silane of the type $R_4Si$, any organosilicon compound of the type $R_nSi(OR')_{4-n}$ and any partial hydrolyzate thereof, any organosiloxane of the formula

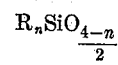

and any silcarbane of the formula

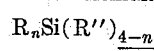

or any combination of such compounds in all of which compounds and combinations there is at least 1 alkenyl group per molecule and in which the remaining R, R' and R" groups are hydrocarbon radicals or halogenated hydrocarbon radicals. In the siloxanes $n$ can have an average value from .5 to 3.

Specific examples of organosilicon compounds which are operative herein are tetraallylsilane, vinyltrimethylsilane, vinyltriethoxysilane, dihexenyldioctadecyloxysilane, vinyldimethylmethoxysilane, hexenylvinyldiphenoxysilane, allylmethylsiloxane, monovinylsiloxane, bis-octadecenyltetramethyldisiloxane, divinylsiloxane, chlorophenylhexenylsiloxane and copolymers of vinylmethylsiloxane and allylmethylsiloxane; copolymers of dichlorophenylsiloxane, vinylmethylsiloxane and phenylmethylsiloxane; copolymers of dimethylsiloxane, diphenylsiloxane and vinyldimethylsiloxane; copolymers, of $\alpha,\alpha,\alpha$-trifluorotolylmethyl, monovinyl, monomethyl, dimethyl and styrylmethylsiloxane; copolymers of tetrafluorocyclobutylsiloxane, octafluorocyclohexenylmethylsiloxane, pentafluoroethylsiloxane and vinylmethylsiloxane; copolymers of trimethylsiloxane, $SiO_2$ and vinylmethylsiloxane;

$$ViMe_2Si\langle\bigcirc\rangle SiViMe_2$$

and $$(-SiCH_2SiO-)_x \quad \begin{matrix} Me_2 & Vi \\ & \\ Me \end{matrix}$$

In carrying out the reaction of this invention it is not necessary that the $SO_2$ react with every alkenyl group in the organosilicon compound. Useful products are often obtained when only part of the alkenyl groups are reacted with the $SO_2$ thereby giving products which contain residual alkenyl hydrocarbon groups attached to the silicon. These products may be further polymerized by treatment with other alkenyl polymerization catalysts such as aromatic acyl peroxides or sulfur.

The amount of $SO_2$ employed in relation to the silicon compound is not critical and may range from less than sufficient to react with all of the alkenyl groups to a large excess over that required to add to all the alkenyl groups. In most cases it is preferable to employ a large excess of $SO_2$ since it often acts as a solvent for the sulfone addition product. If a chemical catalyst is employed in the reaction, it may be added per se or in the form of an alcoholic solution or in any other convenient form.

The products of this invention are useful per se as lubricants. They are also useful as intermediates in the preparation of organosilicon resins and rubbers. The process of this invention represents a novel method of curing organosiloxanes containing alkenyl groups. For example, in those cases where the organosilicon compound is a copolymer containing minor amounts of alkenyl groups, the material may be set to a rubber or resin by reaction with $SO_2$ under the conditions of this invention. The resulting product will be primarily an organosiloxane which has been cross-linked via the sulfone addition linkage.

If desired, organic olefinic compounds can be copolymerized with alkenyl organosilicon compounds by employing the sulfone addition reaction. For example, a mixture of vinylmethylsiloxane and n-butene can be reacted with $SO_2$ in the presence of silver nitrate at room temperature to give a copolymer of the butene and siloxane sulfone addition products. Consequently the products of this invention can be readily incorporated into organic sulfone resins in order to upgrade their thermal stability and weather resistance.

The products of this invention likewise can be copolymerized with other olefinic compounds such as unsaturated diolefins, alcohols, esters, acids and cyanides.

The following examples are illustrative only and should not be construed as limiting the invention, the scope of which is properly delineated in the appended claim.

Example 1

10 cc. of $SO_2$, 4 drops of a 1% silver nitrate solution in absolute ethanol and 5 cc. of monovinyl mono(chlorotrifluorocyclobutyl) hexamethyl cyclotetrasiloxane were placed in a closed container, shaken well to insure thorough mixing and allowed to stand at room temperature until the liquid contents were converted into a clear solid. The vessel was then cooled and opened and the excess $SO_2$ removed with water. The resulting product was found by analysis to have a silicon to sulfur ratio of 5.5:1.

This material was a sulfone addition product in which the $SO_2$ was attached to two different ethylene groups.

Example 2

50 g. of the siloxane of Example 1, 100 g. of $SO_2$ and 40 drops of a 1% silver nitrate solution in absolute ethanol were allowed to stand in a closed container. After 2½ months it was found that much of the $SO_2$ had leaked from the container. The residue was removed and washed free of $SO_2$ to give a soft, white grease. This material was an incomplete reaction product which contained 3% by weight sulfur indicating that it contained unreacted vinyl groups. The material was useful as a lubricant.

Example 3

50 g. of a copolymer of 4 mol percent methylvinylsiloxane and 96 mol percent dimethylsiloxane, 100 g. of $SO_2$ and 5 drops of a 1% solution of silver nitrate in absolute ethanol were placed in a closed container and allowed to stand at room temperature for 2 weeks. The product was then washed free of $SO_2$ and was found to be a rubbery, tough, clear material. A sample of it was heated to 300° C. and there was no appreciable decomposition. Analysis of the product showed it to contain sulfur.

This polymer can be milled with a filler such as fume silica and heated with benzoyl peroxide to give a vulcanized rubber useful for electrical insulation.

Example 4

10 cc. of $SO_2$, 5 cc. of divinyltetramethyldisiloxane and 4 drops of a 1% silver nitrate solution in absolute ethanol were mixed in a closed container. After 1 hour a heavy precipitate was noticed. The product was freed from $SO_2$ in the usual manner to give a crystalline material melting at 170° C. This material was analyzed and found to contain 15.3 percent sulfur and to have a sulfur to silicon ratio of 1.4 and a carbon to sulfur ratio of 6.

Example 5

When allyltrimethylsilane is reacted with $SO_2$ in accordance with the procedure of Example 1, a polymeric compound having the grouping $$\begin{bmatrix} Me_3 \\ Si \\ CH_2 \quad O_2 \\ -CHCH_2S- \end{bmatrix}$$

is obtained.

Example 6

When hexenyltriethoxysilane is reacted with $SO_2$ in accordance with the procedure of Example 1, a polymeric compound having the unit structure $$\begin{bmatrix} & & SO_2 \\ & & CH_2 \\ (EtO)_3SiCH_2CH_2CH_2CH_2CH & \end{bmatrix}_x$$

is obtained.

Example 7

Equivalent results are obtained when a benzene soluble copolymer of 10 mol percent $$CH_2=CH\langle\bigcirc\rangle SiO_{3/2}$$

20 mol percent $PhMeSiO$, 20 mol percent $MeSiO_{3/2}$, 20 mol percent $\alpha,\alpha,\alpha$-trifluorotolylmethylsiloxane, 20 mol percent pentachlorophenylmethylsiloxane and 10 mol percent octadecylcyclohexylsiloxane is reacted with $SO_2$ in the manner of Example 3. This product contains the group $$(\equiv Si)\langle\bigcirc\rangle \begin{matrix} H & O_2 \\ CCH_2S- \end{matrix}$$

Example 8

A resinous material is formed when a copolymer of 50 mol percent vinylallylsiloxane and 50 mol percent vinyloctadecenylsiloxane is reacted with SO₂ in the manner of Example 1. The product is cross-linked by the sulfone linkages.

Example 9

A resinous product is obtained when

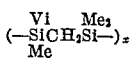

is reacted with SO₂ in accordance with the method of Example 1. The product is cross-linked by sulfone linkages.

That which is claimed is:

A method of preparing organosilicon sulfones which comprises reacting (1) SO₂ with (2) an organosilicon compound having at least one alkenyl group per molecule, the remaining valences of the silicon atoms in said organosilicon compound being satisfied by substituents of the group consisting of hydrocarbon radicals, halohydrocarbon radicals, hydrocarbonoxy radicals and oxygen, in the presence of (3) a catalyst of the group consisting of ultraviolet light, amine oxides, metallic chlorates, metallic nitrates, ozonides, peracids, and peroxides.

References Cited in the file of this patent

UNITED STATES PATENTS 2,719,165    Cooper _____ Sept. 27, 1955

OTHER REFERENCES

Gilman et al.: "Am. Chem. Society Journal," vol. 72 (1950), pp. 2629–2632.

Cooper: "Am. Chem. Society Journal," vol. 76, pp. 3713–3715 (1954).

UNITED STATES PATENT OFFICE
Certificate of Correction

Patent No. 2,833,801

May 6, 1958

George W. Holbrook

It is hereby certified that error appears in the printed specification of the above numbered patent requiring correction and that the said Letters Patent should read as corrected below.

Column 3, lines 17, 18, and 19, the formula should appear as shown below instead of as in the patent—

Signed and sealed this 22nd day of July 1958.

[SEAL]

Attest:
KARL H. AXLINE,
*Attesting Officer.*

ROBERT C. WATSON,
*Commissioner of Patents.*